April 17, 1956 — W. L. HOLLANDER — 2,741,927
RATCHET MECHANISM FOR CHAIN HOISTS
Filed Jan. 30, 1952 — 5 Sheets-Sheet 1
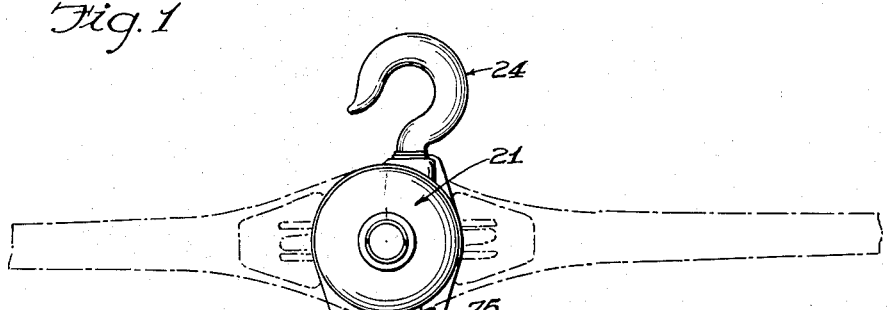
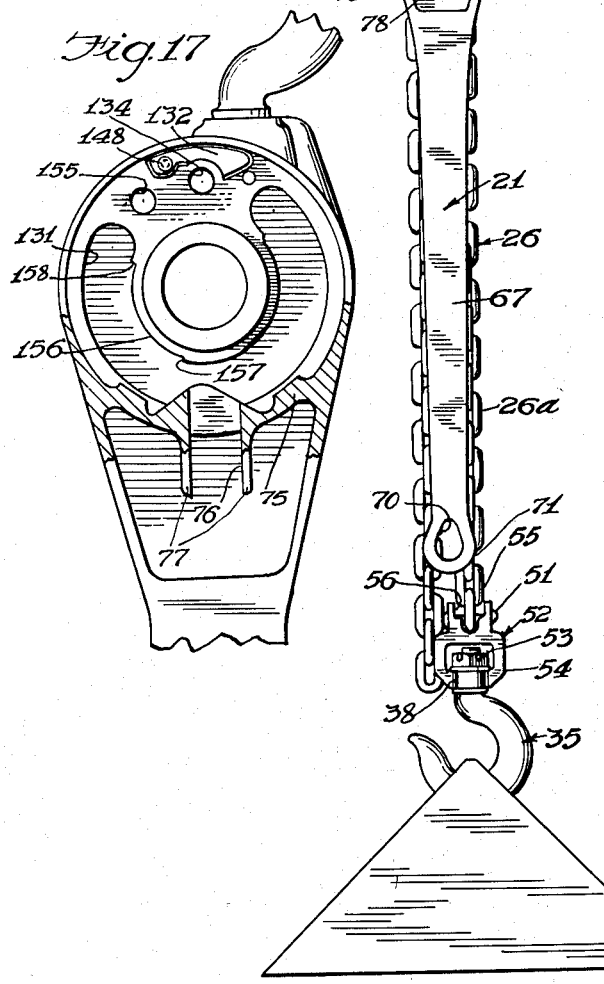
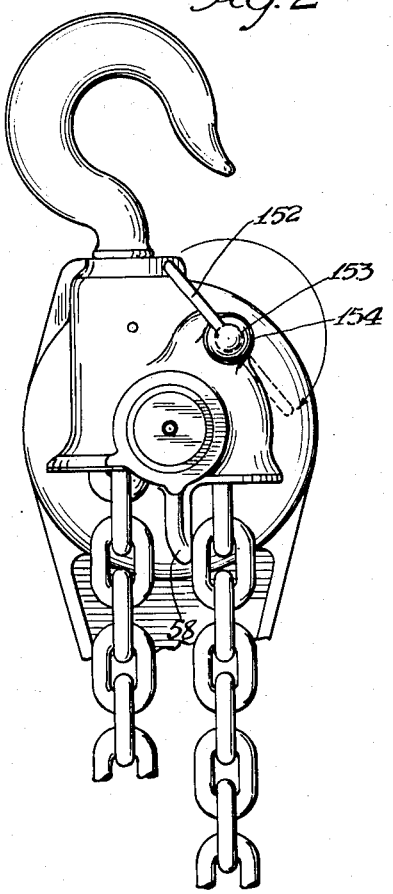
INVENTOR.
William L. Hollander
BY Robt. H. Wendt
Attorney

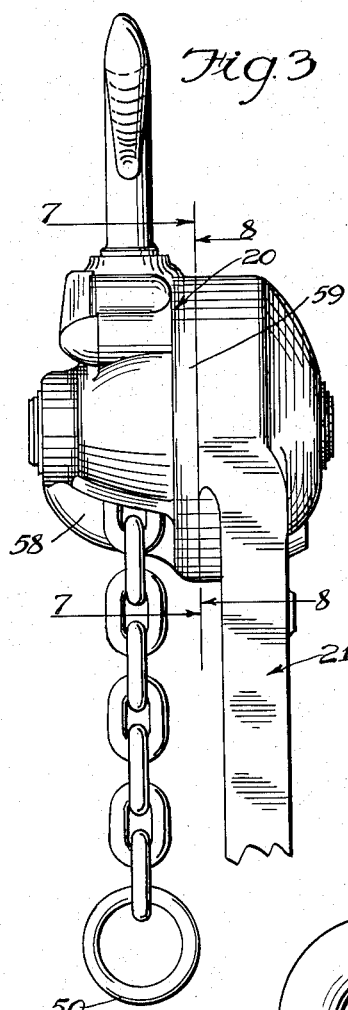
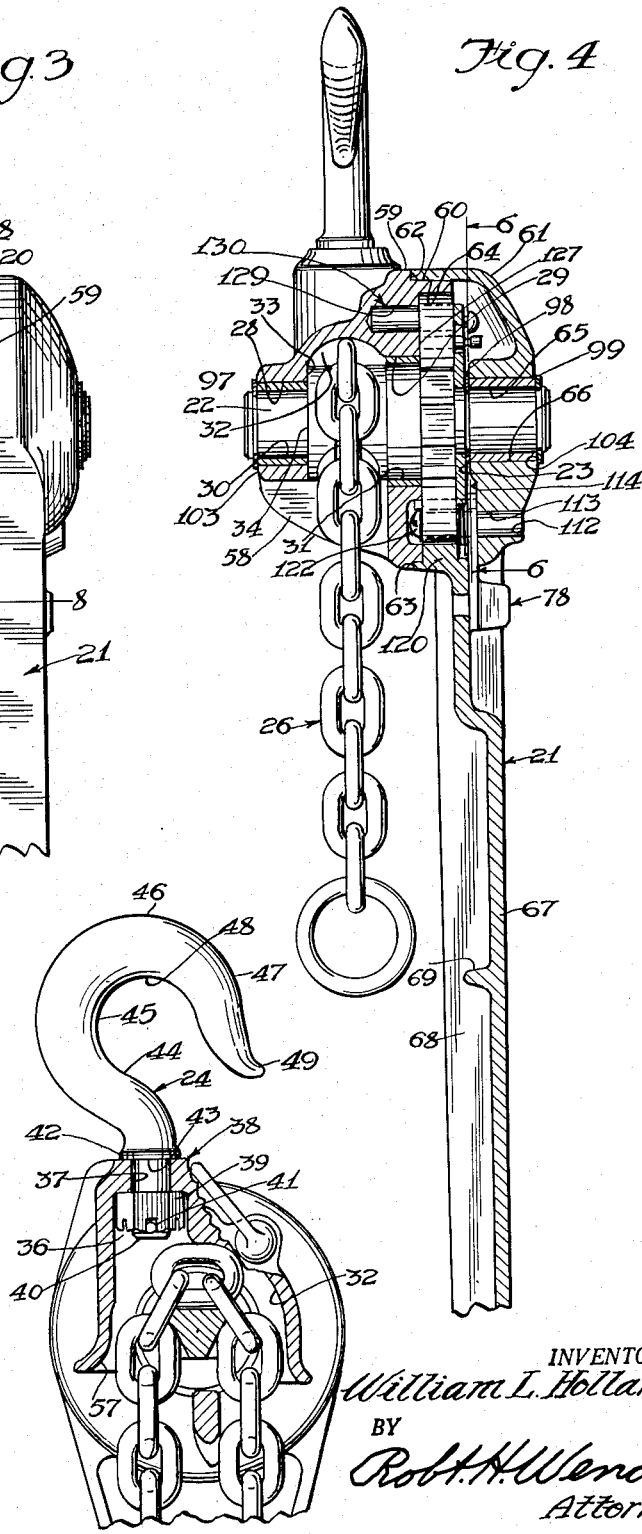
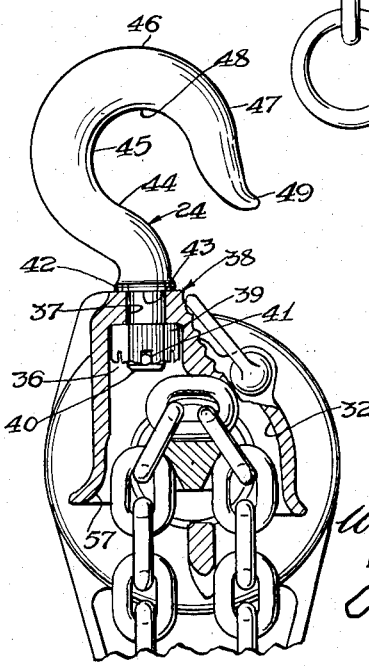

April 17, 1956 W. L. HOLLANDER 2,741,927
RATCHET MECHANISM FOR CHAIN HOISTS
Filed Jan. 30, 1952 5 Sheets-Sheet 3

INVENTOR.
William L. Hollander
BY
Robt H. Wendt
Attorney.

April 17, 1956 W. L. HOLLANDER 2,741,927
RATCHET MECHANISM FOR CHAIN HOISTS
Filed Jan. 30, 1952 5 Sheets-Sheet 4
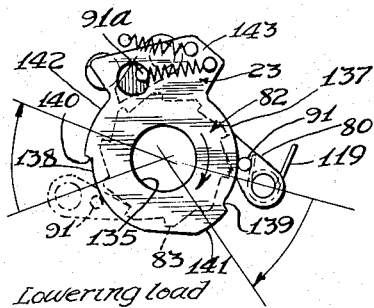
Fig. 10
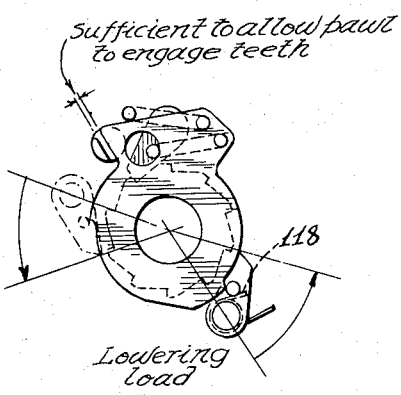
Fig. 11
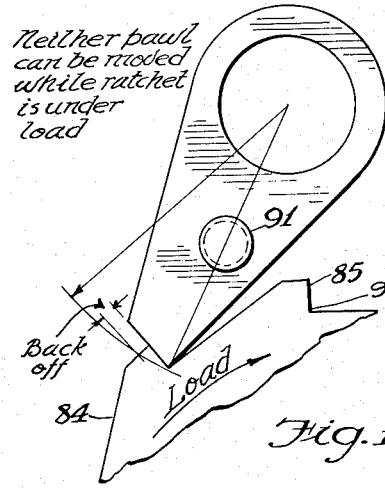
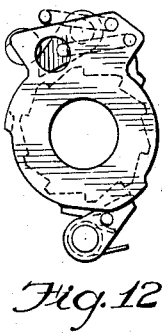
Fig. 12
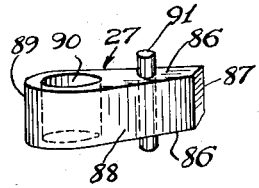
Fig. 13
Fig. 14
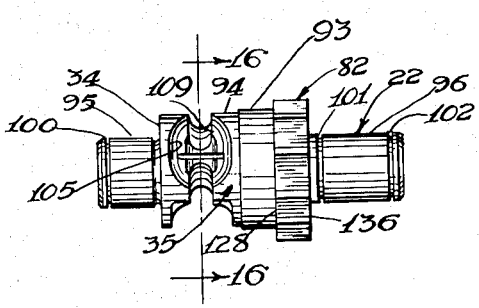
Fig. 15
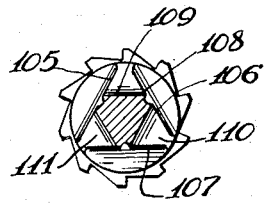
Fig. 16
INVENTOR.
William L. Hollander
BY
Robt. H. Wendt
Attorney April 17, 1956 W. L. HOLLANDER 2,741,927
RATCHET MECHANISM FOR CHAIN HOISTS
Filed Jan. 30, 1952 5 Sheets-Sheet 5

INVENTOR:
William L. Hollander
by Robert H. Wendt
Attorney

United States Patent Office 2,741,927
Patented Apr. 17, 1956

2,741,927

RATCHET MECHANISM FOR CHAIN HOISTS

William L. Hollander, Centralia, Mo., assignor to A. B. Chance Company, Centralia, Mo., a corporation of Missouri Application January 30, 1952, Serial No. 269,032

23 Claims. (Cl. 74—152)

The present invention relates to ratchet mechanism for chain hoists, and is particularly concerned with the improvement and simplification of ratchet mechanism for chain hoists and the provision of an improved unloading mechanism for such devices.

One of the objects of the invention is the provision of an improved ratchet mechanism for disengaging the handle pawl from the ratchet in a hoist of the class described, so that the handle may be freely moved to the best working position without disturbing the load.

Another object of the invention is the provision of an improved ratchet mechanism for a hoist of the class described in which the work chain may be released in any of a multiplicity of positions for free extension to hook up a load when the hoist is not supporting a load.

Another object of the invention is the provision of an improved ratchet mechanism for a hoist construction in which the number of parts or elements is reduced to a minimum, and in which the parts are simplified in shape and structure so that the hoist may be manufactured at a low cost, and which may be taken apart, reassembled and maintained in a working condition with a minimum amount of effort.

Another object of the invention is the provision of an improved hoist of the class described, having the advantages of internal stops; multiple freewheeling positions; adjustable handle position without affecting load; light weight; maximum lifting power; easy accessibility to the parts; permanently lubricated bearings; no clutches or brakes to slip or wear, and easy maintenance or replacement of parts in the field.

Other objects and advantages of the invention will be apparent from the following description and the accompanying drawings, in which similar characters of reference indicate similar parts throughout the several views.

Referring to the drawings, of which there are five sheets,

Fig. 1 is a side elevational view of the hoist, showing the handle in two alternative dotted-line positions;

Fig. 2 is a fragmentary elevational view of the other side of the hoist;

Fig. 3 is a fragmentary elevational view taken from the right side of Fig. 2;

Fig. 4 is a view similar to Fig. 3, with the housing broken away to show the internal construction;

Fig. 5 is a view similar to Fig. 2, with portions of the housing broken away to show the construction of the chain wheel and hook support;

Fig. 10 is a fragmentary elevational view of the unloading mechanism showing the parts in the position for lowering the load with an alternative position, shown in dotted lines;

Fig. 11 is a view similar to Fig. 10, showing the parts of the mechanism in the position which they assume when the holding pawl is holding the load and the handle pawl is moving back to a new position in lowering the load;

Fig. 12 is a similar view showing the parts of the loading mechanism in the freewheeling position;

Fig. 13 is a view in perspective of one of the pawls;

Fig. 14 is an enlarged fragmentary, elevational view of one of the pawls showing its manner of engagement with the ratchet so that it cannot be disengaged when it is under load;

Fig. 15 is a side elevational view of the integral shaft, chain wheel and ratchet;

Fig. 16 is a sectional view taken on the plane of the line 16—16, Fig. 15, looking in the direction of the arrows;

Fig. 17 is a view similar to Fig. 9, with the springs, unloader plate and pawls removed to show the housing face construction;

Figure 6:
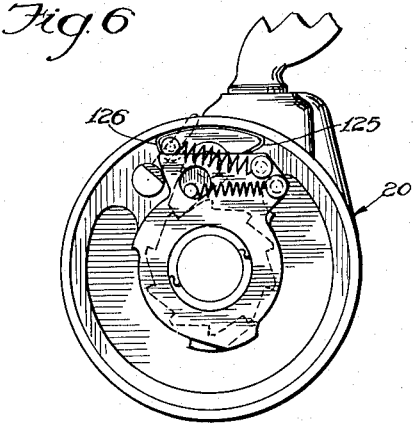
Fig. 6 is a fragmentary sectional view taken on the plane of the line 6—6 of Fig. 4, looking in the direction of the arrows.

Referring to Figs. 1 to 5, the present chain hoist preferably includes a one-piece housing 20, a one-piece handle 21, a one-piece shaft 22, Fig. 15, a one-piece unloader plate 23, Fig. 10, two identical hooks 24, 25, Fig. 1, a chain 26, and two identical pawls 27, of the type shown at Fig. 13.

The housing 20 comprises a cast metal body which has a bore 28 and an aligned counterbore 29, provided with self-lubricating bearings 30, 31, respectively, for supporting the shaft 22.

The space between the bores 28 and 29 is occupied by a cavity 32 which is bounded on the left side by a thrust surface 33 for engaging the annular thrust surface 34 on the shaft 22.

The cavity 32 is concavely curved so that it passes the links of the chain 26 when they are arranged on edge about the chain wheel 35, Fig. 15, and have a suitable clearance but prevent the chain from jumping out of the grooves of the chain wheel.

The cavity 32 has an upwardly extending bore 36, which is axially located over the axis of the depending chain portion 26a which supports the hook 25. The bore 36 is in alignment with a counterbore 37 for receiving the shank 38 of the upper hook 24.

The bore 36 receives the nut 39 on the threaded portion 40 of the hook shank 38, and the nut is secured in place by a through cotter pin 41, arranged in a notch in the nut and passing through a hole in the shank.

The housing 20 preferably has a plane thrust surface 42 above the bore 37, engaging an annular thrust surface 43 on the hook, and the hook is preferably curved away from the axis of the shank 38 at 44, extending upwardly at 45, forwardly at 46 and downwardly at 47, so that its point of load 48 is axially arranged above the axis of the shank 38.

The hook has an outwardly curved point 49 for convenient engagement with a support. At one end of the chain the last link preferably supports a closed metal ring 50, positively preventing the chain from being withdrawn from the hoist entirely, because the ring 50 is too large to pass the cavity 32.

At the other end of the chain the last link passes the shank of a rivet 51, by means of which it is pivotally secured to a swivel hook housing 52. The hook 25 may be identical with the hook 24 and has a similar nut.

The swivel hook housing comprises a metal member having a rectangular through aperture 53 communicating with the bore 54, which receives the hook shank 38. The swivel hook housing 52 has a recess 55 in its upper end for receiving the last link edgewise when pivotally mounted on the rivet 51.

Suitable clearance 56 is provided for the next link which extends crosswise, thus permitting the pivotal movement on the last link. The hook 25 rotates in the swivel hook housing 52 and the hook 24 rotates in the hoist housing 20. The axes of both hooks are substantially in alignment with each other.

The cavity 32 of the housing 20 is preferably bell mouthed at 57 at its lower end for guiding the chain into the cavity; and the housing 20 preferably has a depending pointed flange 58, Fig. 2, between the load chain and the slack chain coming off the chain wheel.

At its right side, Fig. 3, the housing 20 may have a circular portion 59, provided with a turned cylindrical surface 60 for receiving the cover 61, which forms an integral part of the handle 21. The housing has an annular shoulder 62 between the round outer part 59 and the turned surface 60 for engaging the edge 63 of the cover plate 61.

Cover plate 61 is an integral part of handle 21, and comprises a substantially cylindrical enlargement having a cylindrical bore 64 fitting on the turned portion 60 of the housing. Cover plate 61 also has a bearing bore 65, which is located axially with respect to the bores 28 and 29 and is furnished with a self-lubricating bearing 66.

The handle 21 preferably comprises a cast metal member having an elongated bar 67 for providing sufficient leverage in actuating the ratchet wheel. The bar 67 may comprise a channeled member having two side flanges 68 and joined by a web, and the side flanges may be joined by a plurality of transverse reinforcing flanges 69.

At its lower end handle 21 preferably has an enlarged aperture 70, forming an eye for attachment of a hand line, and the enlargement 71 surrounding the eye forms a hand stop for preventing the hand from slipping off the end of the handle.

At the juncture between the cover plate 61 and the handle bar 67, the handle 21 has a tapered enlargement 72 formed by diverging side flanges 73. These flanges define a cavity 74 on the outer side of the handle, the cavity also being defined by a rim flange 75. The rim flange 75 has an aperture 76 extending through it into the cover 21, Fig. 9, and is bordered by a pair of stop flanges 77.

These stop flanges 77 determine the range of movement for a release key 78, which projects through the aperture 76, and has an outwardly projecting rib 79 for engagement with the fingers. Release key 78 permits the withdrawal of the working pawl 80 from the ratchet wheel at any time when it is not under load.

The two pawls which may be identical in construction are the handle pawl or working pawl 80 and the holding pawl 81, further to be described.

Referring to Fig. 15, this is a view of the shaft 22, which carries the chain wheel 35 and an integral ratchet wheel 82. The ratchet wheel 82 comprises an integral enlargement substantially as wide as the thickness of the pawls which engage the ratchet wheel.

The enlargement has a peripheral surface 83 at each tooth, and it has a beveled surface 84 and a load-engaging surface 85 which is at such an angle that the ratchet must be backed off before a pawl can be released, as shown in Fig. 14.

The shape of the pawls is shown in Fig. 13, and each pawl comprises a metal member having the upper and lower plane sides 86, and the pawl tapers from its working end surface 87 along both of the other sides 88 to a substantially semicylindrical end 89.

The pawl has a concentrically located through bore 90 at its larger end and it has a cylindrical stop pin 91 extending through the pawl, parallel to the axis of bore 90 and parallel to the plane of the working end 87.

The working end surface 87 which carries the load of the pawl is not radial but is so arranged that the corner 92, between the working surface 85 of the ratchet and the beveled surface 84, is undercut, as shown in Fig. 14, the working end 87 fitting against the load surface 85 on the ratchet when the pawl is properly installed.

Thus the loading tends to draw the pawl into engagement with the ratchet when there is a load, and neither pawl can be moved out of engagement with the ratchet when the pawl supports a load.

If one pawl supports a load, then the other pawl must be used to back off the ratchet and relieve the load before the first-mentioned pawl can be moved out of engagement with the ratchet wheel. This is an important safety feature, and the angularities of the surfaces 87 and 85 with respect to a radius are shown in Fig. 14.

Referring again to Fig. 15, the shaft 22 has a bearing surface 93, formed on a relatively large radius for engagement in the bearing 31. The cylindrical surface 94 of the chain wheel 35 is formed on a smaller radius, and the bearing surface 95 which engages the bearing 30 is formed on a still smaller radius.

The shaft is provided at its right end, Fig. 15, with a bearing surface 96, fitting in the bearing 66. The shaft, housing and cover 61 are held in assembled relation, Fig. 4, by means of snap rings 97, at the left end, 98, between the housing and cover, and 99 on the outside of the cover.

These snap rings are made of two parts having complementary grooves forming a flat annulus when assembled, and the snap rings extend into the grooves 100, 101 and 102, respectively, Fig. 15. The snap rings project from the grooves sufficiently to engage the end thrust surface 103, Fig. 4, the load plate 23, Fig. 4, and the end thrust surface is removably mounted in the housing, but the cover may be removed by removing the snap ring 99 and the rest of the assembly will be maintained in assembled position by snap rings 97 and 98.

The chain wheel 35 is formed with a plurality of oval sockets 105, 106, 107, arranged at angles of 120° with respect to each other, as shown in Fig. 16, about an integral hub portion 108, and adapted to receive those links of the chain which engage flatly against the chain wheel.

Between the flat oval sockets 105–107, the chain wheel 35 is provided with the slots 109, 110, 111, each of which has a semicircular base, as shown in Fig. 15, for receiving the links which engage the chain wheel edgewise.

The location and arrangement of the slots 109–111 and the sockets 105–107 is such that the links of the chain fit the chain wheel as the chain passes over the chain wheel, so that the chain is capable of driving the chain wheel or supporting a load by means of the chain wheel.

The handle head supports the working pawl or handle pawl 80 by means of the working pawl post 112. Post 112 is pressed into a cylindrical bore 113 in the handle head 61, Fig. 4, where it is frictionally supported, and it pivotally supports the release key 78 which has a bore to receive the pawl post 112.

Figure 18:
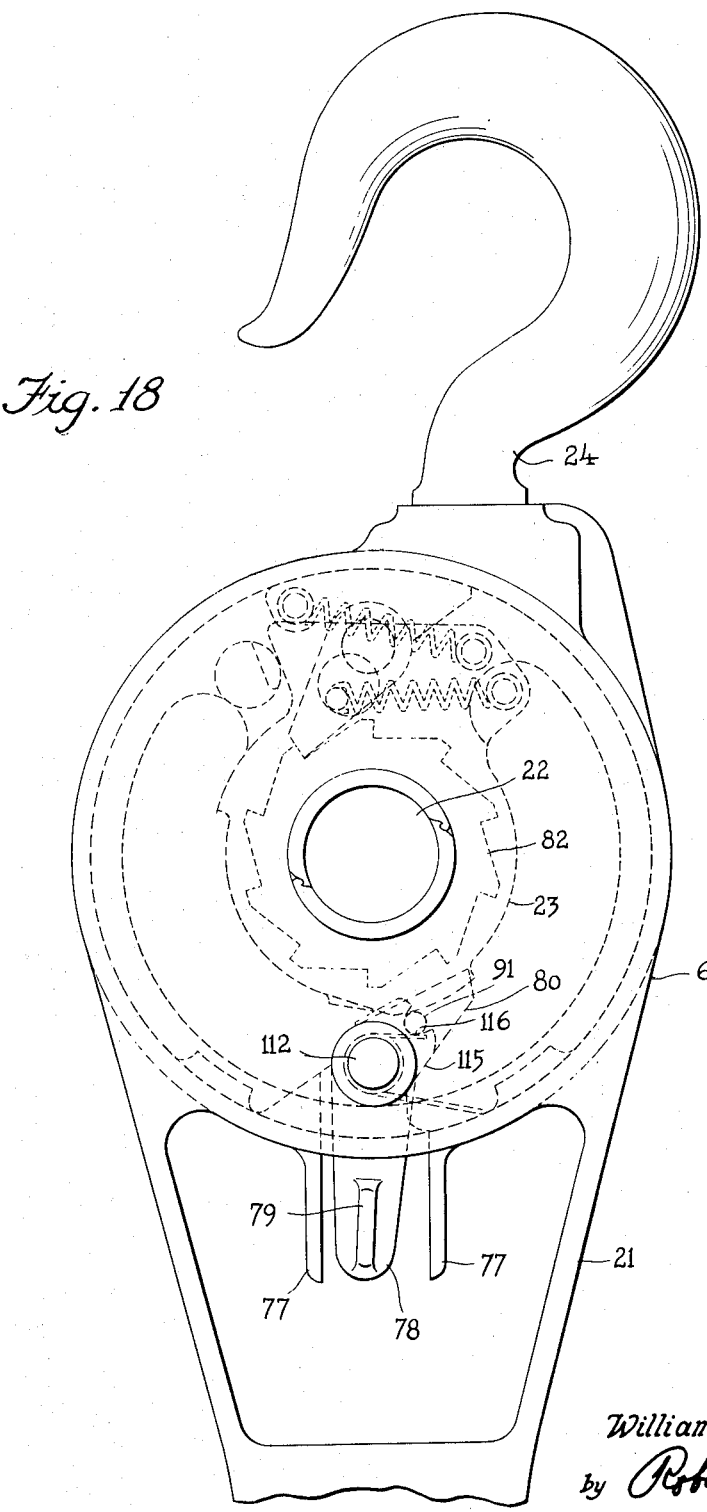
Fig. 18 is a fragmentary side elevational view of the hoist ratchet mechanism, showing the ratchet and its pawls and ratchet release in dotted lines.

The handle head 61 has a thickened body surrounding the bore 113 and a plane surface 114 on its inner side engaging the release key 78. The release key 78 comprises a flat metal member having a bearing hole for the post 112 and having a laterally turned extension 115 provided with a slot 116, located to receive the lower end of the stop pin 91 of Fig. 13 (see Fig. 18). The release key 78 must be placed on the post 112 before the post is pressed into the head 21 because the release key projects laterally through a slot or aperture 76.

A coil spring 117 is next placed upon the post 112, and the coil spring 117 has a plurality of loose turns about the post and a pair of projecting ends. The end 118 engages below the upper end of the stop pin 91, Fig. 11, to urge the pawl into ratchet-engaging position, while the other spring end 119 engages the wall of the head 21 and the spring is provided with initial tension, constantly urging the working pawl 80 into engaging position.

Figure 7:
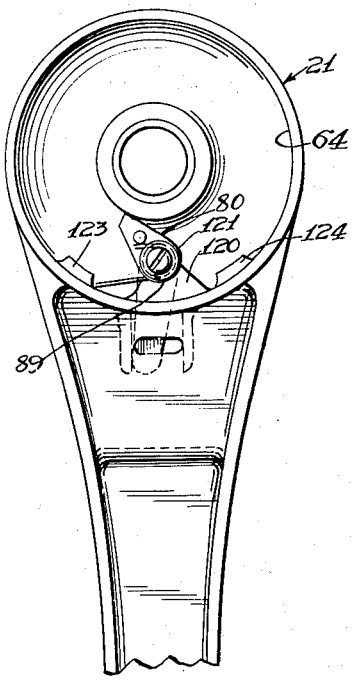
Fig. 7 is a fragmentary side elevational view of the handle and cover plate after it has been removed from the housing, and taken on the plane of the line 7—7 of Fig. 3.
Figure 9:
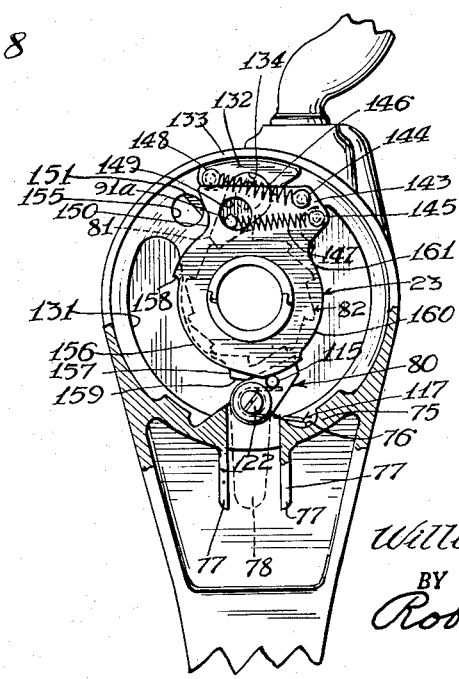
Fig. 9 is a fragmentary sectional view taken through the handle and showing the control of the handle pawl.

The working pawl 80 may be pivoted out of engaging position by means of the release key 78, which may be pivoted toward the right in Fig. 7 or toward the left in Fig. 9 to move the working pawl 80 out of ratchet engagement and to hold it in such position.

Besides having the head thickened around the bore 113, the head is provided with a thicker wall portion 120, Fig. 4, Fig. 7, backing up the pawl 80. This wall portion 120 has a partially cylindrical surface 121 engaging the cylindrical end 89 of the pawl so that the pawl is pivotally supported not only by the post 112, but by the cylindrical socket 121 in the head which also bears much of the load on the pawl.

The post 112 has a threaded bore for receiving a screw bolt 122, which is provided with a washer which secures the pawl on the post 112. The inner cylindrical surface 64 of the handle head 21 is provided with a pair of stop lugs 123 and 124, projecting radially inward, limiting the rotative movement of the handle on the housing.

The stop lugs 123 and 124 on the handle head engage the housing stops 125 and 126 on the housing 20. This gives the handle a wide range of movement so that it may be used to actuate the ratchet by pulling downward on one side or by lifting upward on the other side, and the range is sufficient to permit the ratchet to be moved two notches in one lever movement or it may be moved one notch if desired.

The housing 20 has a plane face 127, Fig. 4, on its inner side for engaging the thrust surface 128 on the left side of the ratchet wheel 82, Fig. 15, and for also engaging and supporting the holding pawl.

The housing body is provided with a cylindrical bore 129, Fig. 4, for receiving the holding pawl post 130, which comprises a cylindrical metal member which is pressed into the face 127 of the housing. Holding pawl post 130 pivotally supports the holding pawl 81, which is identical in shape with the working pawl 80, shown also in Fig. 13.

The inner face of the housing body 20 is provided with an arcuate groove 131, surrounding the ratchet wheel and providing space for the working pawl which is carried by the handle head 21.

The housing body also has a thickened wall portion at 132 provided with an outer cylindrical surface 133, rotatably engaging the cover 21, and with an inner partially cylindrical socket 134 engaging the curved end 89 of the holding pawl 81. Thus the holding pawl is backed up by the thickened wall 132, which the pawl rotatably engages as well as being rotatably mounted upon the holding pawl post 130.

The unloading plate 23 comprises a flat metal plate having upper and lower parallel plane surfaces and provided with a central bore 135 for receiving the shaft bearing portion 96, adjacent the ratchet wheel 82, which has a plane thrust surface 136, Fig. 15.

The groove 101 contains the snap rings 98, holding the unloading plate 23 against removal from the shaft but permitting its relative rotation.

Unloading plate 23 has a pair of circular edge portions 137, 138, oppositely located and terminating in the stop shoulders 139, 140, Fig. 10. The circular edge portions 141 and 142, beyond the stop lugs 139 and 140 may be of larger radius so that the stop lugs 139 and 140 are adapted to engage the stop pins 91 on the working pawl, whether the working pawl 80 be held by the handle in the right-hand position, shown in full lines in Fig. 10, or the left-hand position shown in dotted lines in Fig. 10.

The unloading plate 23 also has a radial enlargement 143, Fig. 10, for supporting the loading and unloading springs. For this purpose the loading plate 23 carries a pair of raised posts 144 and 145, Fig. 9, at the right side of the radial enlargement 143, these posts being grooved peripherally to receive the hooked-shaped end of the two springs 146 and 147, respectively.

Spring 146 has its other end hooked upon a similar grooved post 148, carried by the body enlargement 132, toward the left of the post 144, Fig. 9. Thus the spring 146 urges the unloading plate 23 counterclockwise in Fig. 9.

Spring 147 has its left end, Fig. 9, hooked about the pin 91a, carried by holding pawl 81, and projecting through a circular aperture 149 in the loading plate 23. Thus the spring 147 tends to pull the holding pawl 81 into engagement with the ratchet wheel 82 by acting on the unloading plate 23 which it tends to rotate counterclockwise.

The radial enlargement 143 of the loading plate 23 has a radial engaging surface 150, Fig. 9, which is engaged by the eccentric end portion 151 of a shift key head. The shift key comprises a thumb lever 152, Fig. 2, fixedly mounted on a stub shaft 153 by means of a socketed hub 154.

The stub shaft 153 passes through a bore 155 in the housing and is provided with the head 151, which is cylindrical but is ground away leaving only an eccentric segment that engages the actuating surface 150.

When the shift key 152 is in the upper position, shown in Fig. 2, in full lines, the eccentric segment 151 of the head is in the position of Fig. 9 and holds the unloading plate in that position against the tension springs 146 and 147.

When the shift key 152 is turned to the dotted line position of Fig. 2, the eccentric head 151 rotates to the position shown in Figs. 10 and 11, permitting the unloading plate to be moved by the springs in a counterclockwise direction in Figs. 10 and 11, from the position of Fig. 9 to that of Fig. 10 or Fig. 11.

Figure 8:
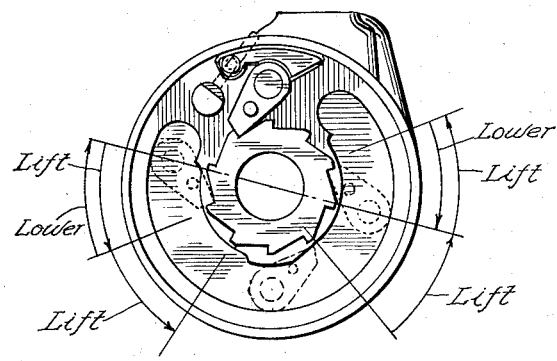
Fig. 8 is a fragmentary sectional view taken on the plane of the line 8—8 of Fig. 3, with the handle and housing assembled and showing alternative lowering and lifting positions for the handle pawl.

The right side of the aperture 149 in the unloading plate 23, Fig. 8, engages the stop pin 91a of the holding pawl 81 during this motion of the unloading plate, and pivots the holding pawl 81 upward to the position of Fig. 10 from that of Fig. 9, out of engagement with the ratchet wheel, for the lowering of a load, with the parts in the position of Fig. 10 as distinguished from the lifting of a load, with the parts in the position of Fig. 9. Thus the shift key 152 may be used to select the two operations of the mechanism, one for lifting and the other for lowering a load.

When the parts are in the position of Fig. 10, the springs 146 and 147 are still under tension and cannot come off their respective posts. The clearance of the pin 91a in the hole 151 in the unloading plate is sufficient to permit the holding pawl 81 to ratchet freely over the teeth without hindrance.

Referring to Fig. 13 again, it will be noted that the pin 91 on any pawl 27 projects from the bottom of the pawl as well as from the top. The upper projection of the pin 91 is engaged by the unloading plate 23, which in Fig. 9 is above the pawls and ratchet wheel. The lower projection of each pin 91 is in position to be engaged by certain stops which are carried by the body of the housing on the inner boundary of the arcuate recess 131.

This inner boundary may have a wall 156 of reduced radius, shown in dotted lines in Fig. 9, below the unloader plate 23, and terminating at a stop surface 157 at one end and a stop surface 158 at its upper end. The full line 159, Fig. 9, indicates a wall portion surrounding the arcuate recess 131 on the inside, which is formed at a larger radius, and the right side of the inner wall of this arcuate recess, indicated at 160, terminates at a stop surface at 161, also adapted to engage the lower end of the pin 91 of the working pawl 80.

The surface 122 serves to press against the pin 91 of the working pawl 80 whenever the working handle is hanging downward, as shown in Fig. 9, pushing the working pawl 80 out of engagement with the ratchet.

In order for the working pawl to engage the ratchet the handle must be in one of the lateral positions in which the pin 91 of working pawl 80 does not engage the surface 122, but is riding along the surface 156 or 160, which surfaces provide sufficient clearance with respect to the pin 91 so that the working pawl 80 can ratchet freely and can hold the load.

When the handle is raised from the position of Fig. 9 to the right-hand dotted line position of Fig. 1, far enough for the pin 91 to engage the shoulder 161 on the body, this also lifts the body working pawl from the ratchet, provided the working pawl is not at that time supporting a load.

When the handle is moved to the left-hand dotted line position of Fig. 1 from that of Fig. 9, the pin 91 of the working pawl 80 may engage the stop surface 158 on the housing; and the pawl 80 is lifted from the ratchet, provided it is not at that time supporting a load.

Operation

The operation of the hoist is as follows:

The hoist is first hung upon a suitable support by means of the top hook 24. To extend the work chain 26 so that the lower hook 25 can be engaged with the load, the shift lever 152 should be turned to the down position. As previously stated, this so rotates the shift head 151 that the unloading plate rotates counterclockwise from the position of Fig. 9 to that of Fig. 10; and the edge of the hole 149 lifts the holding pawl by means of its engagement with the pin 91a. The holding pawl is now out of engagement with the ratchet; and freewheeling may be accomplished by disengaging the working or handle pawl.

Disengagement of the handle pawl can be accomplished in three ways. If the handle is in the position of Fig. 1, extending downwardly away from the top hook 24, the surface 159 of the housing groove 131 or surface 141 of unloader plate 23 is pressing against the pin 91 of the working pawl 80, holding it in the position of Fig. 9, out of engagement with the ratchet.

Thus both pawls will be out of engagement if the shift key 152 is turned downward and the handle hangs downward; and under these conditions there is nothing to hold the ratchet wheel; and a freewheeling condition exists with respect to the chain.

The chain may be pulled in either direction by pulling upon either end, extending the hook end of the chain to engage the load or taking up the slack between the hook and the hoist by merely pulling on the chain.

If the handle 21 is rotated clockwise to the dotted line position, at the left of Fig. 1, until stop 158 engages pin 91 on working pawl 80, the pressure on the pin 91 will lift the working pawl out of engagement with the ratchet and permit freewheeling, provided the shift key is downward.

In any other position of the handle, except straight down or far up to the left, it is only necessary to turn down the shift key to release the holding pawl and to turn the release key from its normal position toward the left in Fig. 1 to remove the working pawl from engagement with the ratchet.

Thus the present hoist permits a number of convenient ways of effecting freewheeling of the chain; but the chain can never be put into freewheeling when there is a load on either pawl because the ratchet wheel has to be backed off from a pawl before a pawl can be released.

Taking up slack can be accomplished, on the load end of the chain, by putting the shift key in the upper position and pressing the release key to the left. Under these conditions the pull on the chain to remove the slack which exists between the hook and the hoist merely causes the ratchet wheel to ratchet over the holding pawl, while the working pawl is held out of engagement with the ratchet by means of the release key.

For lifting a load the shift key 152 should be turned to the up position. In this position the holding pawl is urged into engagement with the ratchet wheel by spring 147, and whenever the handle is in a position extending toward either side, the working pawl 80 is urged into engagement with the ratchet wheel by its spring.

Assuming that the lower hook has been attached to a load and the slack taken up and the shift key is in the up position, the handle 21 may then be pumped up and down through a maximum of 72 degrees plus over-travel on either side to rotate the shaft 22 through $\frac{1}{10}$ or $\frac{1}{5}$ of a revolution, dependent upon the amount of stroke, whether it be more than 36 degrees or more than 72 degrees.

Referring to Fig. 9, when the handle is being pumped on the right side of the position shown, the load will be placed on the handle when the handle is being lifted. When the handle is being pumped on the left side of Fig. 9, the load is being lifted and the ratchet actuated by a downward pull of the handle, which is usually the way in which the handle is employed.

In order to move the handle from one of these lateral pumping positions to the other of the lateral pumping positions, it is only necessary to press the release key 78 to disengage the working pawl 80 from the ratchet and to lift the pin 91 over the projecting portion 159 of the housing groove 131, when moving the handle counterclockwise.

When moving the handle clockwise from one of the lateral positions to the other, the handle may be swung freely from one position to the other because the pawl 80 may then ratchet over the teeth, and the stop pin 91 likewise ratchets over the unloader plate projection 139.

For lowering a work load held by the hoist, it is only necessary to turn the shift key 152 to the down position and to pump the handle through 36 degrees plus over-travel, with the pin 91 of the working pawl 80 in either of the positions, shown in full lines or dotted lines in Fig. 10, adjacent to the unloader plate stops 139 or 140.

The load is initially supported by the holding pawl 81, and the load prevents the spring 146 from rotating the unloader plate 23. The handle is swung until pawl 80 engages a tooth. Further swinging transfers the load from the holding pawl 81 to the working pawl 80.

When the load has been removed from the holding pawl 81, this holding pawl can move away from the ratchet and the spring 146 causes the unloader plate 23 to move counterclockwise until the shift key 152 stops its travel by means of the shift key head 151, which is in the position of Fig. 10.

This movement of the unloading plate 23 lifts the holding pawl 81. The load now being borne by the handle, the working pawl 80 continues to be lowered without the interference of the holding pawl, but the working pawl cannot be withdrawn from the ratchet because the load tends to keep it in engagement with the ratchet. Continued rotation of the ratchet lowering the load brings the stop pin 91 into engagement with the unloader plate 23 at 139 or 140, depending whether the handle is extending toward the right or left of Fig. 10.

When, during the lowering of a load, the working pawl pin 91 engages the unloader 23 at 139 or 140, it causes the unloader plate to rotate in a clockwise direction, Fig. 10, with the handle, causing the springs 146 and 147 to be extended and moving the edge of the hole 149 away from the pin 91a, so that spring 147 can pull the holding pawl down into engagement with the ratchet.

At this time the ratchet is, of course, moving clockwise in Fig. 10, and as soon as a tooth load surface 85 engages the end surface 87 of holding pawl 81, the holding pawl takes the load and continued motion of the handle causes the locking pressure to be removed from the working pawl 80.

The spring 146 now returns the unloader plate 23 until the surface of the hole 151 stops against the pin 91a of the holding pawl 81. This action drives the stops 139 or 140 on the unloader plate 23 counterclockwise in Fig. 10, under the pin 91 of working pawl 80 to raise the working pawl from the ratchet.

The working pawl 80 is then supported by the unloader plate only until it has advanced to the next tooth, when it returns to the ratchet and takes the load and the operation is repeated.

It will thus be observed that I have invented an improved chain hoist of the ratchet type which is adapted to permit freewheeling and to lift or to lower a load with the handle operated for lifting or lowering on either side of the hoist, and freewheeling accomplished in several different manners.

The present hoist is safe in that the pawls cannot be disengaged from the ratchet whenever they carry a load, and the number of parts has been reduced to a minimum.

The present chain hoist may be serviced with simple tools in the field so that it is capable of easy maintenance and easy replacement of parts. It may be manufactured at a low cost because of the interchangeability of certain parts and the reduced number of parts as compared with the devices of the prior art.

It may be used with roller link chains merely by changing the type of chain wheel or sprocket. All of its parts are enclosed against the weather and the principal wearing parts are provided with self-lubricating bearings.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A ratchet actuator for chain hoists comprising a housing, an integral shaft rotatably mounted in said housing and having a ratchet wheel, an integral cover plate and handle rotatably mounted on said shaft and enclosing said ratchet wheel, a holding pawl pivotally mounted on said housing in position to engage said ratchet wheel and a working pawl pivotally mounted on said integral cover and handle in position to engage said ratchet wheel, and resilient means for urging said pawls into engagement with the ratchet wheel, the said housing being provided on its face toward said working pawl with an arcuate groove bounded by an inner wall extending about said shaft, said inner wall being provided with an engaging surface located at a greater radius and adapted to engage a pin projecting beside it from said working pawl, to hold the working pawl out of engagement with the ratchet wheel when the handle is in depending position, permitting the freewheeling of the shaft so far as the working pawl is concerned, the said working pawl pin projecting also from its other side and said working pawl being rotatably mounted upon a working pawl post, and a release lever rotatably mounted on said post and having a notch for receiving the pin of said working pawl, the release lever projecting from the housing to permit manual movement of the working pawl out of engagement with the ratchet wheel.

2. A ratchet actuator for chain hoists comprising a housing, an integral shaft rotatably mounted in said housing and having a ratchet wheel, an integral cover plate and handle rotatably mounted on said shaft and enclosing said ratchet wheel, a holding pawl pivotally mounted on said housing in position to engage said ratchet wheel and a working pawl pivotally mounted on said integral cover and handle in position to engage said ratchet wheel, and resilient means for urging said pawls into engagement with the ratchet wheel, the said housing being provided on its face toward said working pawl with an arcuate groove bounded by an inner wall extending about said shaft, said inner wall being provided with an engaging surface located at a greater radius and adapted to engage a pin projecting beside it from said working pawl, to hold the working pawl out of engagement with the ratchet wheel when the handle is in depending position, permitting the free-wheeling of the shaft so far as the working pawl is concerned, said housing being provided with a thickened wall portion located opposite to the ratchet wheel engaging surface of each pawl, and said thickened wall portion being provided with a partially cylindrical surface engaging a complementary cylindrical surface on the adjacent end of each pawl, the said latter surfaces being concentric with the axis of rotation of each pawl.

3. A ratchet actuator for chain hoists comprising a housing, an integral shaft rotatably mounted in said housing and having a ratchet wheel, an integral cover plate and handle rotatably mounted on said shaft and enclosing said ratchet wheel, a holding pawl pivotally mounted on said housing in position to engage said ratchet wheel and a working pawl pivotally mounted on said integral cover and handle in position to engage said ratchet wheel, and resilient means for urging said pawls into engagement with the ratchet wheel, the said housing being provided on its face toward said working pawl with an arcuate groove bounded by an inner wall extending about said shaft, said inner wall being provided with an engaging surface located at a greater radius and adapted to engage a pin projecting beside it from said working pawl, to hold the working pawl out of engagement with the ratchet wheel when the handle is in depending position, permitting the free-wheeling of the shaft so far as the working pawl is concerned, the said working pawl pin projecting also from its other side and said working pawl being rotatably mounted upon a working pawl post, and a release lever rotatably mounted on said post and having a notch for receiving the pin of said working pawl, the release lever projecting from the housing to permit manual movement of the working pawl out of engagement with the ratchet wheel, the said inner wall being also provided with engaging surfaces of greater radius located upwardly on each side of said wall to engage the adjacent pin on the working pawl at the end of its upward stroke to remove the working pawl from engagement with the ratchet wheel at the upper ends of its stroke, said ratchet wheel and both pawls having their load engaging surfaces located at an undercut angle diverging from the radial so that the pawls cannot be removed from engagement with the ratchet wheel without backing the wheel off when the pawl being removed carries a load.

4. A ratchet actuator for chain hoists comprising a housing, an integral shaft rotatably mounted in said housing and having a ratchet wheel, an integral cover plate and handle rotatably mounted on said shaft and enclosing said ratchet wheel, a holding pawl pivotally mounted on said housing in position to engage said ratchet wheel and a working pawl pivotally mounted on said integral cover and handle in position to engage said ratchet wheel, and resilient means for urging said pawls into engagement with the ratchet wheel, the said housing being provided on its face toward said working pawl with an arcuate groove bounded by an inner wall extending about said shaft, said inner wall being provided with an engaging surface located at a greater radius and adapted to engage a pin projecting beside it from said working pawl, to hold the working pawl out of engagement with the ratchet wheel when the handle is in depending position, permitting the free-wheeling of the shaft so far as the working pawl is concerned, the said ratchet wheel and both pawls having their load supporting engaging surfaces located at an undercut angle diverging from the radial whereby a load draws a pawl into tighter engagement with the ratchet wheel, and a pawl cannot be moved out of engagement with the ratchet wheel when the pawl carries a load, except by backing off the ratchet wheel with respect to said pawl.

5. A ratchet actuator for chain hoists comprising a housing, an integral shaft rotatably mounted in said housing and having a ratchet wheel, an integral cover plate and handle rotatably mounted on said shaft and enclosing said ratchet wheel, a holding pawl pivotally mounted on said housing in position to engage said ratchet wheel and a working pawl pivotally mounted on said integral cover and handle in position to engage said ratchet wheel, and resilient means for urging said pawls into engagement with the ratchet wheel, the said housing being provided on its face toward said working pawl with an arcuate groove bounded by an inner wall extending about said shaft, said inner wall being provided with an engaging surface located at a greater radius and adapted to engage a pin projecting beside it from said working pawl, to hold the working pawl out of engagement with the ratchet wheel when the handle is in depending position, permitting the free-wheeling of the shaft so far as the working pawl is concerned, an unloader plate rotatably mounted on said shaft between the ratchet wheel and the pawls, said unloader plate being provided with engaging surfaces located toward the lower limit of a descending stroke lowering a load for engaging a projecting pin on the working pawl and lifting the working pawl from the ratchet wheel.

6. A ratchet actuator for chain hoists comprising a housing, an integral shaft rotatably mounted in said housing and having a ratchet wheel, an integral cover plate and handle rotatably mounted on said shaft and enclosing said ratchet wheel, a holding pawl pivotally mounted on said housing in position to engage said ratchet wheel and a working pawl pivotally mounted on said integral cover and handle in position to engage said ratchet wheel, and resilient means for urging said pawls into engagement with the ratchet wheel, the said housing being provided on its face toward said working pawl with an arcuate groove bounded by an inner wall extending about said shaft, said inner wall being provided with an engaging surface located at a greater radius and adapted to engage a pin projecting beside it from said working pawl, to hold the working pawl out of engagement with the ratchet wheel when the handle is in depending position, permitting the free-wheeling of the shaft so far as the working pawl is concerned, said shaft also supporting an unloader plate rotatably mounted on said shaft between the ratchet wheel and the pawls, and spring means between said housing and unloader plate for urging it in one direction, and spring means between the unloader plate and the holding pawl for urging the holding pawl into engagement with the ratchet wheel.

7. A ratchet actuator for chain hoists comprising a housing, an integral shaft rotatably mounted in said housing and having a ratchet wheel, an integral cover plate and handle rotatably mounted on said shaft and enclosing said ratchet wheel, a holding pawl pivotally mounted on said housing in position to engage said ratchet wheel and a working pawl pivotally mounted on said integral cover and handle in position to engage said ratchet wheel, and resilient means for urging said pawls into engagement with the ratchet wheel, the said housing being provided on its face toward said working pawl with an arcuate groove bounded by an inner wall extending about said shaft, said inner wall being provided with an engaging surface located at a greater radius and adapted to engage a pin projecting beside it from said working pawl, to hold the working pawl out of engagement with the ratchet wheel when the handle is in depending position, permitting the free-wheeling of the shaft so far as the working pawl is concerned, said shaft also supporting an unloader plaate rotatably mounted on said shaft between the ratchet wheel and the pawls, and spring means between said housing and unloader plate for urging it in one direction, and spring means between the unloader plate and the holding pawl for urging the holding pawl into engagement with the ratchet wheel, the said unloader plate being provided with an aperture for passing a pin carried by the holding pawl, the side of said aperture urging said pin in such a direction as to lift the holding pawl from the ratchet wheel when the unloader plate is moved in one direction.

8. A ratchet actuator for chain hoists comprising a housing, an integral shaft rotatably mounted in said housing and having a ratchet wheel, an integral cover plate and handle rotatably mounted on said shaft and enclosing said ratchet wheel, a holding pawl pivotally mounted on said housing in position to engage said ratchet wheel and a working pawl pivotally mounted on said integral cover and handle in position to engage said ratchet wheel, and resilient means for urging said pawls into engagement with the ratchet wheel, the said housing being provided on its face toward said working pawl with an arcuate groove bounded by an inner wall extending about said shaft, said inner wall being provided with an engaging surface located at a greater radius and adapted to engage a pin projecting beside it from said working pawl, to hold the working pawl out of engagement with the ratchet wheel when the handle is in depending position, permitting the free-wheeling of the shaft so far as the working pawl is concerned, said shaft also supporting an unloader plate rotatably mounted on said shaft between the ratchet wheel and the pawls, and spring means between said housing and unloader plate for urging it in one direction, and spring means between the unloader plate and the holding pawl for urging the holding pawl into engagement with the ratchet wheel, the said unloader plate being provided with an aperture for passing a pin carried by the holding pawl, the side of said aperture urging said pin in such a direction as to lift the holding pawl from the ratchet wheel when the unloader plate is moved in one direction, and a shift key rotatably mounted in said housing and having a shaft provided with a head having an eccentric actuating surface for moving the unloader plate from the position for lifting a load to the position for lowering a load.

9. In a ratchet actuator for chain hoists the combination of an enclosure comprising a one-piece housing and a one-piece cover and handle, a shaft rotatably mounted in said housing and rotatably supporting said cover, said shaft having a ratchet wheel in said housing, a pair of identical pawls, one used for holding and the other for working carried by the housing and cover respectively, and separate resilient means for urging said pawls into engagement with said ratchet wheel, manual means for lifting and holding said holding pawl away from the ratchet wheel, and means for holding the working pawl away from the ratchet wheel when the handle is depending vertically from the housing or at the upper limits of its motion in either direction, whereby freewheeling of the ratchet wheel is permitted in a multiplicity of positions, each of said pawls being mounted upon a pawl supporting post and the post being mounted fritionally in bores in the housing and cover plate respectively, and the housing being provided with outwardly projecting wall portions adjacent each pawl post, the wall portion and pawl in each case being provided with a partially cylindrical surface reinforcing the pawl post by the wall slidably engaging the end of the pawl at a point opposite to the working end of each pawl.

10. In a ratchet actuator for chain hoists the combination of an enclosure comprising a one-piece housing and a one-piece cover and handle, a shaft rotatably mounted in said housing and rotatably supporting said cover, said shaft having a ratchet wheel in said housing, a pair of identical pawls, one used for holding and the other for working carried by the housing and cover respectively, and separate resilient means for urging said pawls into engagement with said ratchet wheel, manual means for lifting and holding said holding pawl away from the ratchet wheel, and means for holding the working pawl away from the ratchet wheel when the handle is depending vertically from the housing or at the upper limits of its motion in either direction, whereby freewheeling of the ratchet wheel is permitted in a multiplicity of positions, each of said pawls being mounted upon a pawl supporting post and the post being mounted frictionally in bores in the housing and cover plate respectively, and the housing being provided with outwardly projecting wall portions adjacent each pawl post, the wall portion and pawl in each case being provided with a partially cylindrical surface reinforcing the pawl post by the wall slidably engaging the end of the pawl at a point opposite to the working end of each pawl, the said ratchet wheel and each pawl having their engaging surfaces undercut at an angle diverging from the radial so that neither pawl can be removed from its engagement with the ratchet wheel when said pawl is bearing a load, except by backing off the pawl from the ratchet wheel and transferring the load to the other pawl.

11. In a ratchet actuator for chain hoists or the like, the combination of a support, said support having a transversely extending shaft provided with a ratchet wheel, and said shaft being mounted in bearings on said support, with a cover plate having an integral radial handle extension, said cover plate being rotatably mounted on said support, and having a transverse, centrally located bearing for an extension of said shaft, a holding pawl rotatably mounted on said housing on a transverse axis in position to engage said ratchet wheel, and a working pawl rotatably mounted inside said cover plate upon a transverse axis, to be located to engage said ratchet when the cover is rotatably mounted on the support, separate resilient means for urging each of said pawls into engagement with said ratchet, and each pawl being provided, intermediate its point of engagement with the ratchet and its pivotal mounting, with a laterally projecting pin, said pin extending from both sides of each of said pawls, and an unloading cam mounted on said shaft adjacent said ratchet wheel, and provided with camming surfaces for engaging said pins for lifting the holding pawl out of engagement with the ratchet wheel when the unloading cam is moved to a predetermined position, the said unloading cam being provided with a rise on its lower side, for engaging the pin on the working pawl carried by said cover, and holding the working pawl out of engagement with the ratchet wheel when the handle extends vertically downward, the said housing being provided with an arcuate groove extending downward on one side of said shaft, beneath said shaft and upward on the other side of said shaft, and said groove being bounded by an inner camming boundary having a rise at the bottom and at one of its sides, for engaging the pin on the working pawl, whereby the working pawl is lifted out of engagement with the ratchet wheel when the handle is disposed vertically downward or in a horizontal position, to permit free wheeling of the ratchet wheel and shaft.

12. In a ratchet actuator for chain hoists or the like, the improvement which comprises a support having a pair of bearings, a shaft having a ratchet wheel rotatably mounted in said bearings, a holding pawl pivotally mounted on said support, an actuating handle rotatably mounted on the shaft, a working pawl pivotally mounted on the handle, said ratchet wheel having teeth beveled on one side, and having retaining shoulders on the other side, which are under-cut relative to a radial line, and which are complementary to working end surfaces on said pawls, the loading of the ratchet wheel tending to draw either engaging pawl into full shoulder engagement, so that a pawl cannot be released under load except by taking the ratchet load off said latter pawl, and an unloader plate rotatably mounted upon said shaft, said plate having an aperture outside said ratchet teeth, and said holding pawl having a pin in said aperture, spring means tensioned between said pin and said plate to urge the holding pawl into engaging position, and spring means tensioned between said plate and said support to urge the plate in the same direction, to cause the edge of said aperture to release said pin to permit the holding pawl to move into engaging position.

13. In a ratchet actuator for chain hoists or the like, the improvement which comprises a support having a pair of bearings, a shaft having a ratchet wheel rotatably mounted in said bearings, a holding pawl pivotally mounted on said support, an actuating handle rotatably mounted on the shaft, a working pawl pivotally mounted on the handle, said ratchet wheel having teeth beveled on one side, and having retaining shoulders on the other side, which are under-cut relative to a radial line, and which are complementary to working end surfaces on said pawls, the loading of the ratchet wheel tending to draw either engaging pawl into full shoulder engagement, so that a pawl cannot be released under load except by taking the ratchet load off said latter pawl, and an unloader plate rotatably mounted upon said shaft, said plate having an aperture outside said ratchet teeth, and said holding pawl having a pin in said aperture, spring means tensioned between said pin and said plate to urge the holding pawl into engaging position, and spring means tensioned between said plate and said support to urge the plate in the same direction, to cause the edge of said aperture to release said pin to permit the holding pawl to move into engaging position, and means for moving said plate against the tension of said spring means until the edge of said aperture engages said pin and lifts the holding pawl out of engagement with the ratchet so that free wheeling of the ratchet may be had by disengaging the working pawl.

14. In a ratchet actuator for chain hoists or the like, the improvement which comprises a support having a pair of bearings, a shaft having a ratchet wheel rotatably mounted in said bearings, a holding pawl pivotally mounted on said support, an actuating handle, rotatably mounted on the shaft, a working pawl pivotally mounted on the handle, said ratchet wheel having teeth beveled on one side, and having retaining shoulders on the other side, which are under-cut relative to a radial line, and which are complementary to working end surfaces on said pawls, the loading of the ratchet wheel tending to draw either engaging pawl into full shoulder engagement, so that a pawl cannot be released under load except by taking the ratchet load off said latter pawl, and an unloader plate rotatably mounted upon said shaft, said plate having an aperture outside said ratchet teeth, and said holding pawl having a pin in said aperture, spring means tensioned between said pin and said plate to urge the holding pawl into engaging position, and spring means tensioned between said plate and said support to urge the plate in the same direction, to cause the edge of said aperture to release said pin to permit the holding pawl to move into engaging position, and means for moving said plate against the tension of said spring means until the edge of said aperture engages said pin and lifts the holding pawl out of engagement with the ratchet so that free wheeling of the ratchet may be had by disengaging the working pawl, said support having a cam formation engaging a pin on the working pawl to lift the working pawl from ratchet engagement for free wheeling when the handle is horizontal and when the handle is depending.

15. In a ratchet actuator for chain hoists or the like, the improvement which comprises a support having a pair of bearings, a shaft having a ratchet wheel rotatably mounted in said bearings, a holding pawl pivotally mounted on said support, an actuating handle rotatably mounted on the shaft, a working pawl pivotally mounted on the handle, said ratchet wheel having teeth beveled on one side, and having retaining shoulders on the other side, which are under-cut relative to a radial line, and which are complementary to working end surfaces on said pawls, the loading of the ratchet wheel tending to draw either engaging pawl into full shoulder engagement, so that a pawl cannot be released under load except by taking the ratchet load off said latter pawl, and an unloader plate rotatably mounted upon said shaft, said plate having an aperture outside said ratchet teeth, and said holding pawl having a pin in said aperture, spring means tensioned between said pin and said plate to urge the holding pawls into engaging position, and spring means tensioned between said plate and said support to urge the plate in the same direction, to cause the edge of said aperture to release said pin to permit the holding pawl to move into engaging position, and means for moving said plate against the tension of said spring means until the edge of said aperture engages said pin and lifts the holding pawl out of engagement with the ratchet so that free wheeling of the ratchet may be had by disengaging the working pawl, said working pawl having a projecting pin and a lever pivoted on the handle, and having a slot in its end, embracing said latter pin, said released lever moving the working pawl out of engagement only when it is under no load.

16. In a ratchet actuator for chain hoists or the like, the improvement which comprises a support having a pair of bearings, a shaft having a ratchet wheel rotatably mounted in said bearings, a holding pawl pivotally mounted on said support, an actuating handle rotatably mounted on the shaft, a working pawl pivotally mounted on the handle, said ratchet wheel having teeth beveled on one side, and having retaining shoulders on the other side, which are under-cut relative to a radial line, and which are complementary to working end surfaces on said pawls, the loading of the ratchet wheel tending to draw either engaging pawl into full shoulder engagement, so that a pawl cannot be released under load except by taking the ratchet load off said latter pawl, and an unloader plate rotatably mounted upon said shaft, said plate having an aperture outside said ratchet teeth, and said holding pawl having a pin in said aperture, spring means tensioned between said pin and said plate to urge the holding pawl into engaging position, and spring means tensioned between said plate and said support to urge the plate in the same direction, to cause the edge of said aperture to release said pin to permit the holding pawl to move into engaging position, said holding pawl engaging a ratchet shoulder and holding the load, said handle and working pawl being rotated until the working pawl engages a tooth, whereupon the load is transferred from the holding pawl to the working pawl by further rotation of said handle, said plate then moving, and the holding pawl moving out of engagement until the pin on the working pawl engages a shoulder on said plate, rotating the plate and moving the edge of said aperture from the holding pawl pin, the holding pawl then moving into engagement with the next tooth in a backward direction.

17. In a ratchet actuator for chain hoists or the like, the improvement which comprises a support having a pair of bearings, a shaft having a ratchet wheel rotatably mounted in said bearings, a holding pawl pivotally mounted on said support, an actuating handle rotatably mounted on the shaft, a working pawl pivotally mounted on the handle, said ratchet wheel having teeth beveled on one side, and having retaining shoulders on the other side, which are under-cut relative to a radial line, and which are complementary to working end surfaces on said pawls, the loading of the ratchet wheel tending to draw either engaging pawl into full shoulder engagement, so that a pawl cannot be released under load except by taking the ratchet load off said latter pawl, and an unloader plate rotatably mounted upon said shaft, said plate having an aperture outside said ratchet teeth, and said holding pawl having a pin in said aperture, spring means tensioned between said pin and said plate to urge the holding pawl into engaging position, and spring means tensioned between said plate and said support to urge the plate in the same direction, to cause the edge of said aperture to release said pin to permit the holding pawl to move into engaging position, said holding pawl engaging a ratchet shoulder and holding the load, said handle and working pawl being rotated until the working pawl engages a tooth, whereupon the load is transferred from the holding pawl to the working pawl by further rotation of said handle, said plate then moving, and the holding pawl moving out of engagement until the pin on the working pawl engages a shoulder on said plate, rotating the plate and moving the edge of said aperture from the holding pawl pin, the holding pawl then moving into engagement with the next tooth in a backward direction, said plate having said shoulder located to engage the working pawl pin near the bottom of a stroke of said handle up and down.

18. A ratchet actuator according to claim 16, said plate having said shoulder located to engage the working pawl pin near the top of a stroke of said handle up and down.

19. A ratchet actuator according to claim 16, said plate having two such shoulders to engage the working pawl pin, one near the top and the other near the bottom of the stroke of said handle up and down on either side, so that the loaded ratchet may be moved in a lowering direction by pumping the handle on either side of the support.

20. A ratchet actuator according to claim 16, said holding pawl being out of engagement, a rotatable shift lever carried by said support, and having a camming member moving said plate to a lifting or a lowering position.

21. A ratchet actuator according to claim 20, said shift lever moving said plate against spring tension to the lifting position, the edge of said aperture permitting the load pawl pin to move until the load pawl is drawn into engagement by its spring.

22. A ratchet actuator according to claim 21, said working pawl ratcheting over the teeth when the handle is moved in one direction and engaging a tooth when the handle is moved in the other direction, said handle and working pawl then rotating the ratchet while the holding pawl ratchets over the teeth and holds the ratchet.

23. A ratchet actuator according to claim 22, said pawls being mounted for rotation on pins carried by said support and handle, and each pawl having opposite its working end a cylindrical surface sliding against a concentric cylindrical surface on the support and on the handle opposite to the working end of the pawl to bear the load on each pawl.

References Cited in the file of this patent

UNITED STATES PATENTS

| | | |
|---|---|---|
| 986,826 | Irwin | Mar. 14, 1911 |
| 1,161,610 | Burkholder | Nov. 23, 1915 |
| 1,300,375 | Geiger | Apr. 15, 1919 |
| 1,380,043 | Crewson | May 31, 1921 |
| 1,742,060 | Coulson | Dec. 31, 1929 |
| 2,153,546 | Camp | Apr. 11, 1939 |
| 2,165,984 | Schroeder | July 11, 1939 |
| 2,243,361 | Stahl | May 27, 1941 |
| 2,377,324 | Coffing | June 5, 1945 |
| 2,470,019 | Coffing | May 10, 1949 |
| 2,480,303 | Pennell | Aug. 30, 1949 |